US012419323B2

(12) United States Patent
Lazzarini et al.

(10) Patent No.: US 12,419,323 B2
(45) Date of Patent: Sep. 23, 2025

(54) MACHINE FOR MAKING AND DISPENSING FOOD PRODUCTS

(71) Applicant: ALI GROUP S.R.L.—CARPIGIANI, Cernusco sul Naviglio (IT)

(72) Inventors: Roberto Lazzarini, Reggio Emilia (IT); Federico Tassi, Bologna (IT)

(73) Assignee: ALI GROUP S.R.L.—CARPIGIANI, Cernusco sul Naviglio (IT)

( * ) Notice: Subject to any disclaimer, the term of this patent is extended or adjusted under 35 U.S.C. 154(b) by 430 days.

(21) Appl. No.: 17/680,136

(22) Filed: Feb. 24, 2022

(65) Prior Publication Data
US 2022/0295822 A1 Sep. 22, 2022

(30) Foreign Application Priority Data
Mar. 22, 2021 (IT) .......................... 202021000001463

(51) Int. Cl.
*A23G 9/28* (2006.01)
*A23G 9/12* (2006.01)

(52) U.S. Cl.
CPC .............. *A23G 9/281* (2013.01); *A23G 9/12* (2013.01)

(58) Field of Classification Search
CPC ........ A23G 9/281; A23G 9/283; A23G 9/224; A23G 9/12; A23G 9/28; A47J 43/0716; G23G 9/045; B01F 27/72; B01F 27/724; B01F 27/74; B01F 27/721
See application file for complete search history.

(56) References Cited

U.S. PATENT DOCUMENTS

| | | | | | |
|---|---|---|---|---|---|
| 2,523,853 | A | * | 9/1950 | Woodruff | A23G 9/281 62/69 |
| 3,255,938 | A | * | 6/1966 | Dimmich | A23G 9/281 251/324 |
| 3,868,050 | A | * | 2/1975 | Gorychka | F16K 31/5286 222/509 |
| 4,648,534 | A | * | 3/1987 | Esser | F16K 31/5286 222/511 |
| 4,711,376 | A | * | 12/1987 | Manfroni | A23G 9/281 99/452 |
| 5,106,199 | A | * | 4/1992 | Eckel | B01F 27/091 366/147 |
| 9,816,622 | B2 | * | 11/2017 | Chiba | F16K 27/02 |

(Continued)

*Primary Examiner* — Donnell A Long
(74) *Attorney, Agent, or Firm* — SHUTTLEWORTH & INGERSOLL, PLC; Timothy J. Klima

(57) ABSTRACT

A machine for making and dispensing liquid and/or semi-liquid food products includes: a container for containing the product to be processed and dispensed, the container having a discharge outlet for the product to be dispensed; a stirrer positioned inside the container; a thermal treatment system, associated with the container to treat the product thermally; a dispensing tap mounted on the discharge outlet and including a hollow supporting body and a shutter that is slidably mounted in the supporting body to be movable between an open position, allowing the product to come out through the discharge outlet, and a closed position, preventing the product from coming out through the discharge outlet, a lever movably connected to the shutter, the lever being hinged to the supporting body to rotate relative thereto to allow the shutter to be moved between the open position and the closed position.

24 Claims, 8 Drawing Sheets

(56) References Cited

U.S. PATENT DOCUMENTS

| | | | |
|---|---|---|---|
| 2007/0151991 A1* | 7/2007 | Vannini | A23G 9/045 |
| | | | 222/509 |
| 2015/0096322 A1* | 4/2015 | Cocchi | A23G 9/28 |
| | | | 62/238.7 |
| 2019/0075815 A1* | 3/2019 | Cocchi | A23G 9/281 |
| 2020/0397017 A1* | 12/2020 | Cocchi | A23G 9/28 |
| 2022/0295822 A1* | 9/2022 | Lazzarini | A23G 9/12 |

\* cited by examiner

MACHINE FOR MAKING AND DISPENSING FOOD PRODUCTS

This application claims priority to Italian Patent Application 202021000001463 filed Mar. 22, 2021, the entirety of which is incorporated by reference herein.

BACKGROUND OF THE INVENTION

This innovation relates to a machine for making and dispensing (liquid and/or semi-liquid and/or semi-solid) food products.

More specifically, this innovation relates to machines for making and dispensing food products, such as, for example, ice creams, whipped cream, creams, chocolate, yogurt, jams and the like, which require thermal treatment in their production cycles.

Generally speaking, these machines comprise a container for containing the product to be processed, at least one dispensing tap mounted at the bottom of the front of the container and a stirrer mounted inside the container for mixing the product.

According to known methods, the thermal treatment is generally performed by means of electrical resistors and/or a heating system based on a thermodynamic cycle.

The product is thus processed both mechanically, by means of the stirrer, and thermally, by means of heating and/or cooling units.

There is a very strongly felt need for a machine that is particularly efficient, that is to say, capable of effectively processing food products having a relatively high consistency and viscosity, such as, for example, creams, jams and the like.

In effect, these products, which are particularly viscous, to the point of being semi-solid, are very difficult to process, in particular, to mix and/or extract from the container once they have been processed.

SUMMARY OF THE INVENTION

This innovation has for an aim to meet the above mentioned need.

More specifically, the aim of this invention is to provide a machine for making and dispensing liquid or semi-liquid or semi-solid food products where products having a relatively high consistency and viscosity, (for example, creams and the like) can be processed in a highly effective and efficient manner.

This aim is fully achieved by the machine of the innovation as characterized in the appended claims.

The technical features and advantages of the innovation are more apparent in the following description of a preferred but non-limiting embodiment of it.

BRIEF DESCRIPTION OF THE DRAWINGS

The description refers to the accompanying drawings, which are also provided purely by way of non-limiting example and in which.

DESCRIPTION OF THE PREFERRED EMBODIMENTS

Figure 1:
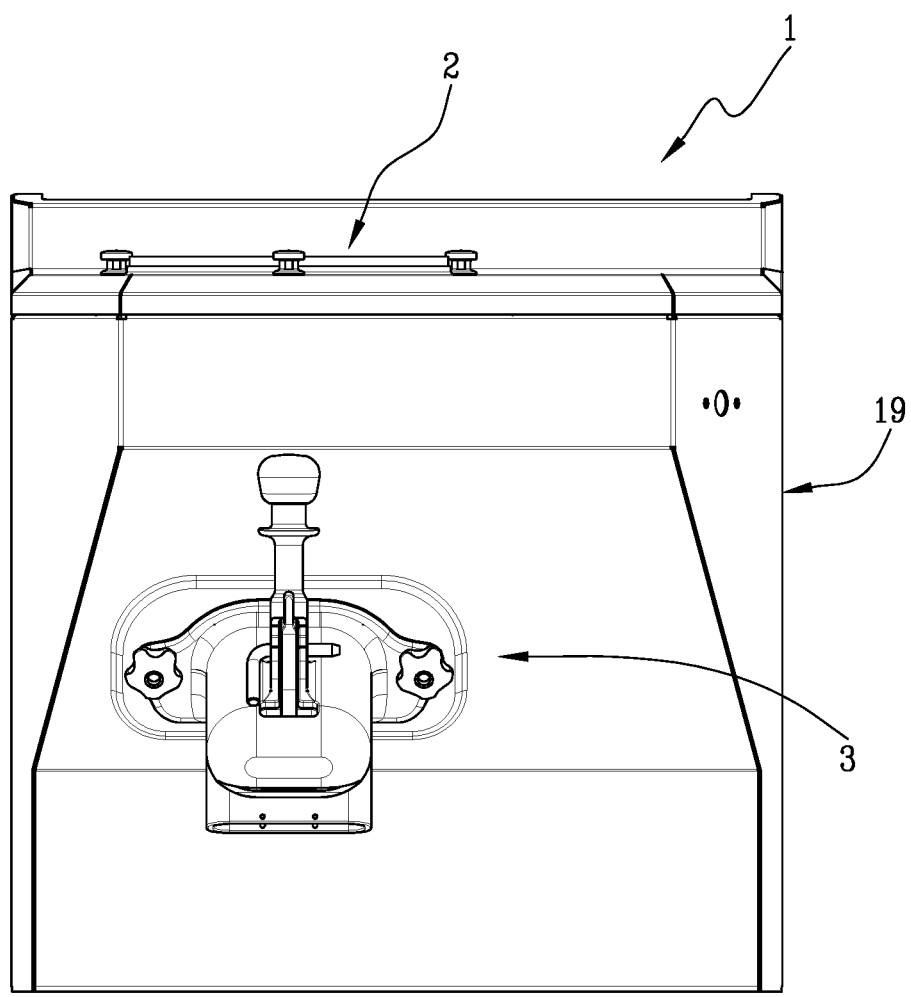
FIG. 1 shows a front perspective view of the machine according to this innovation.
Figure 2:
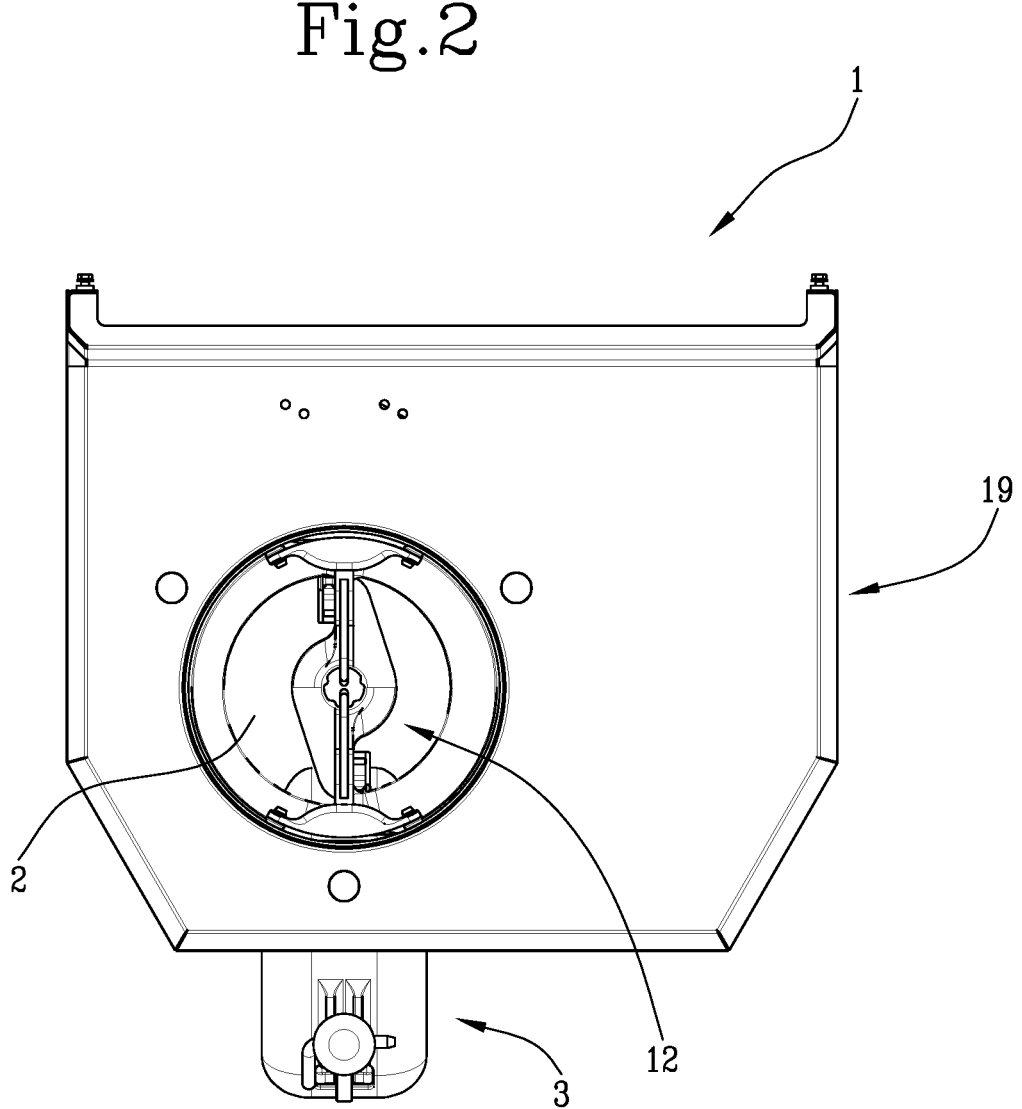
FIG. 2 shows a top view of the machine of FIG. 1.
Figure 3:
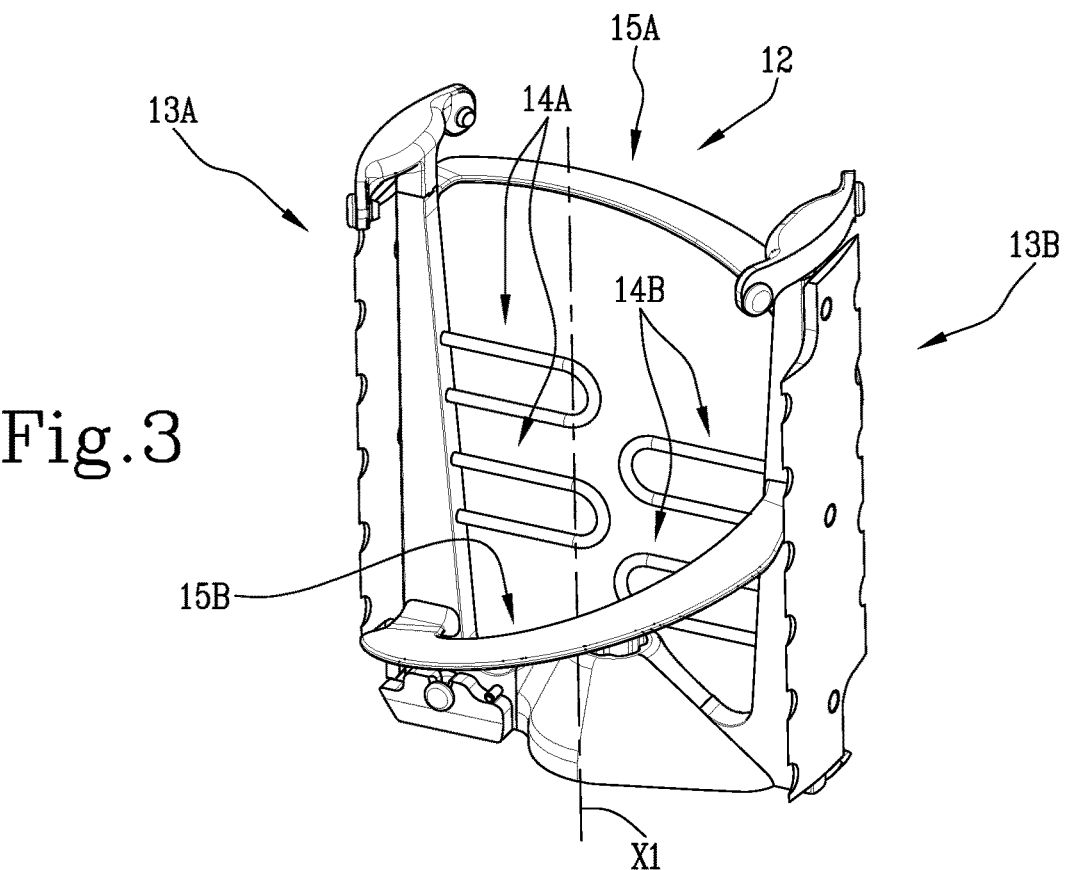
FIGS. 3 and 4 show a detail, specifically a stirrer, of the machine of FIGS. 1 and 2 in respective perspective views.
Figure 4:
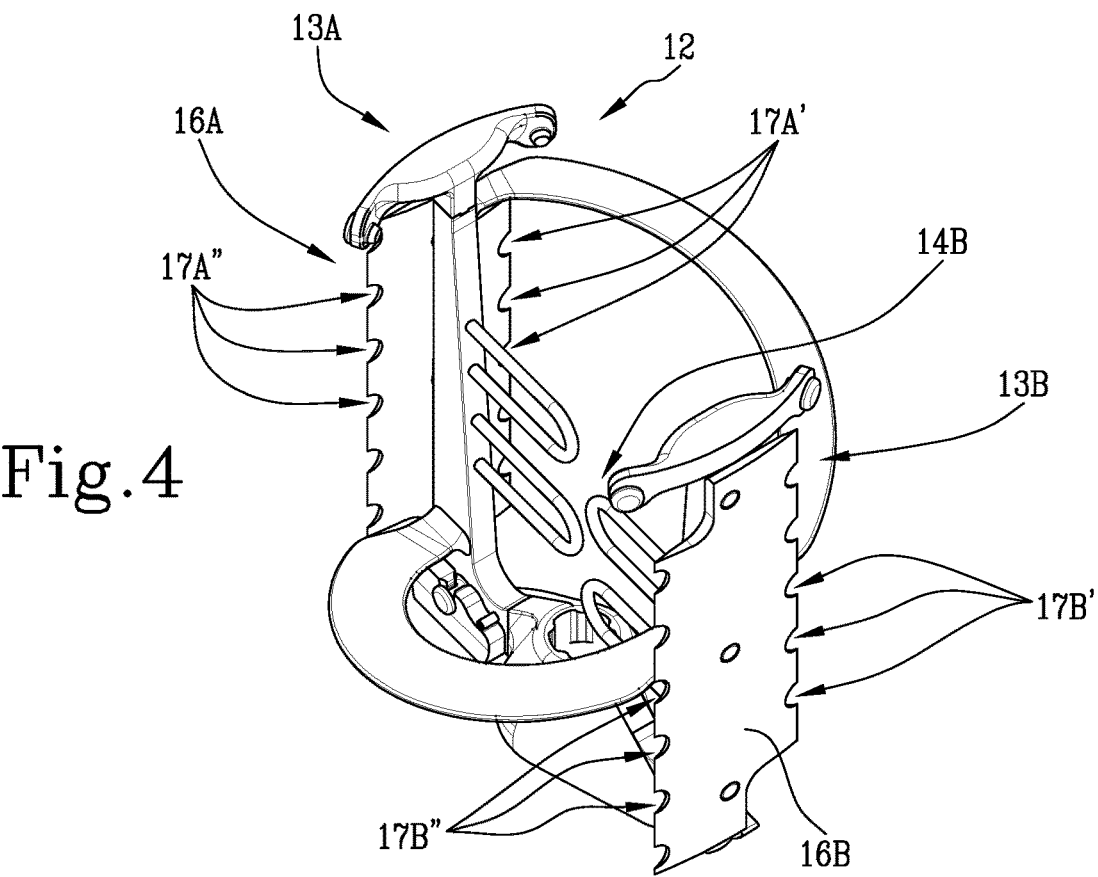
Figure 5:
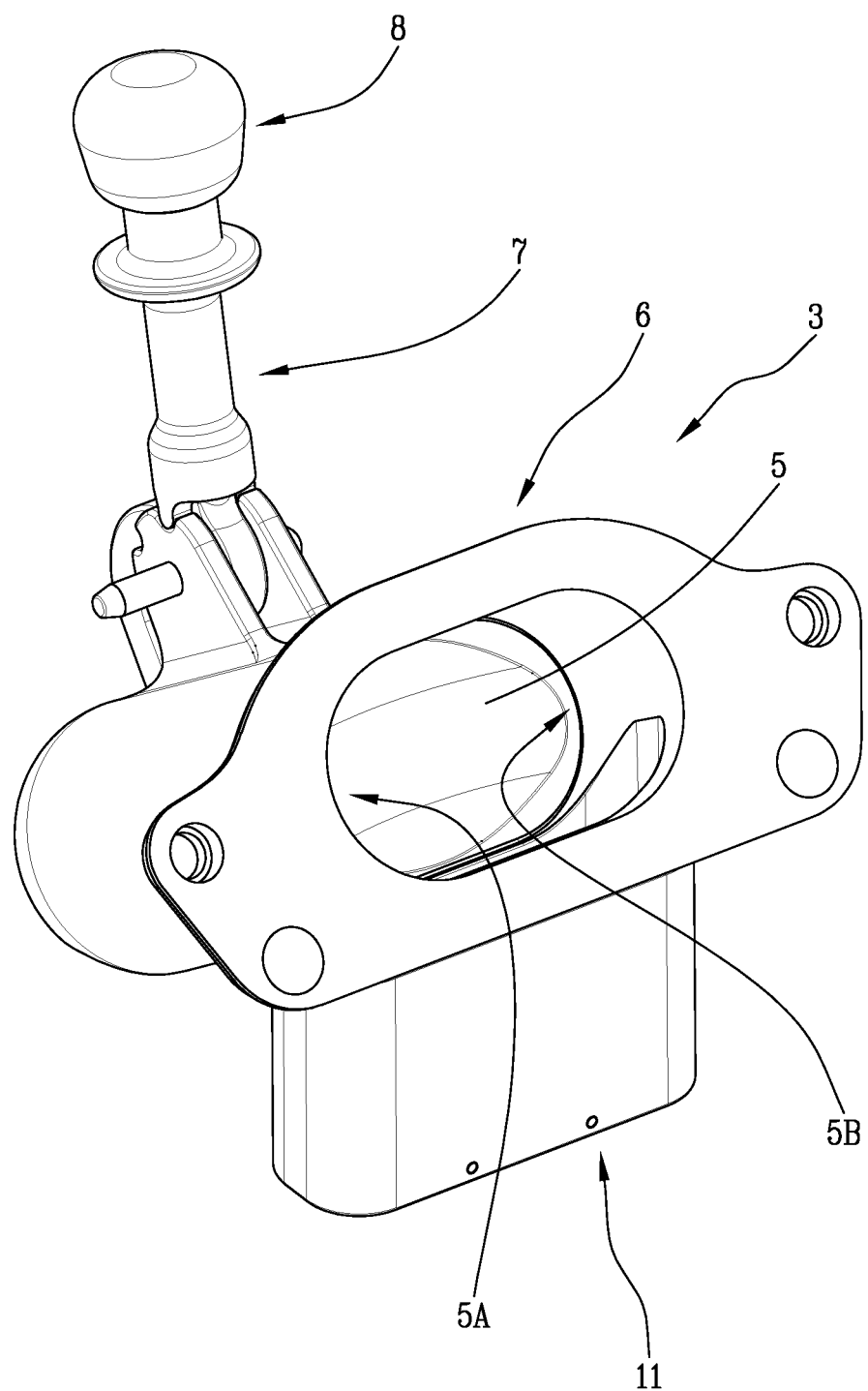
FIG. 5 shows a perspective view of a detail, specifically a tap, of the machine of FIGS. 1 and 2.

With reference to FIG. 1, the numeral 1 denotes in its entirety a machine for making and dispensing food products (preferably liquid or semi-liquid or semi-solid).

More specifically, this innovation relates to a machine 1 for making and dispensing food products, such as, for example, ice creams, whipped cream, creams, chocolate, yogurt, jams and the like, which require thermal treatment in their production cycles.

For example, the food products may be ice creams, whipped cream, creams, chocolate, yogurt or like products.

According to an aspect, the machine 1 for making and dispensing food products, comprises:

at least one container 2 for containing the product to be processed and dispensed, the container 2 having a discharge outlet 4 for the product to be dispensed;

at least one stirrer 12 positioned inside the container 2;

thermal treatment means 20, associated with the container 2 to treat the product thermally;

at least one dispensing tap 3 mounted on the discharge outlet 4 of the container and comprising a hollow supporting body 6 (provided with a cavity 10) and a shutter 5 that is slidably mounted in the supporting body 6 to be movable between an open position P1, where it allows the product to come out through the discharge outlet 4, and a closed position P2, where it prevents the product from coming out through the discharge outlet 4, and at least one lever 7 that is movably connected to the shutter 5.

It should be noted that the shutter 5 is moved between the open position P1 and the closed position P2 in a straight line.

According to an aspect, the shutter 5 comprises a first portion 30A and a second portion 30B which are coupled to each other.

More preferably, the first portion 30A and the second portion 30B are coupled so they extend one after the other along a cavity 10 of the supporting body 6.

The machine 1 comprises a frame 19 on which at least the container 2 for containing the product to be processed and dispensed and the tap 3 are mounted, as are the components that will be mentioned in this disclosure.

The outlet 4 of the container 2 is located on the lower part of the container 2.

Figure 8:
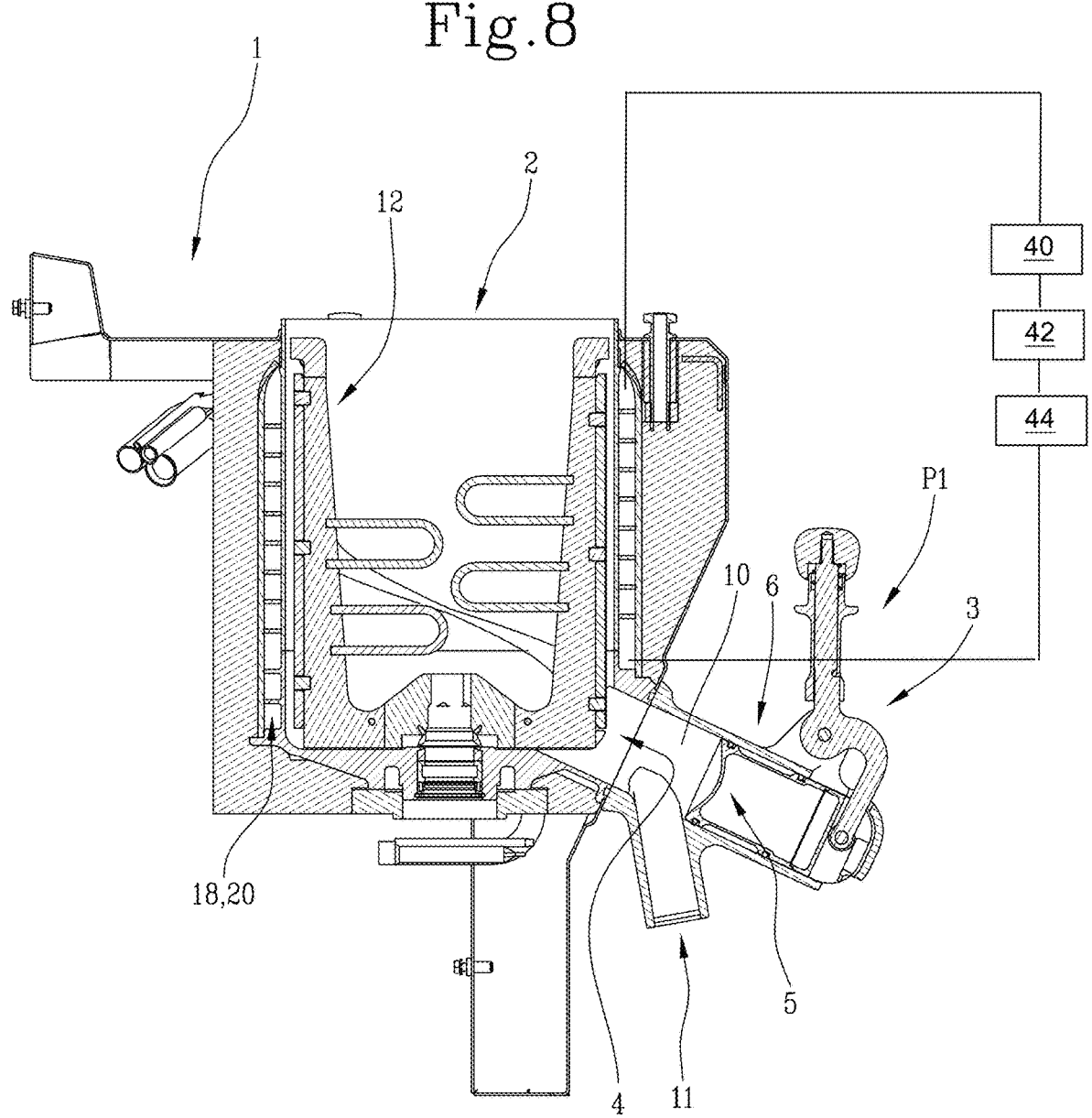
FIGS. 8 and 9 show respective cross sectional views of the machine of FIGS. 1 and 2 with the tap of FIGS. 5, 6A, 6B and 7 in different, open and closed configurations, respectively.
Figure 9:
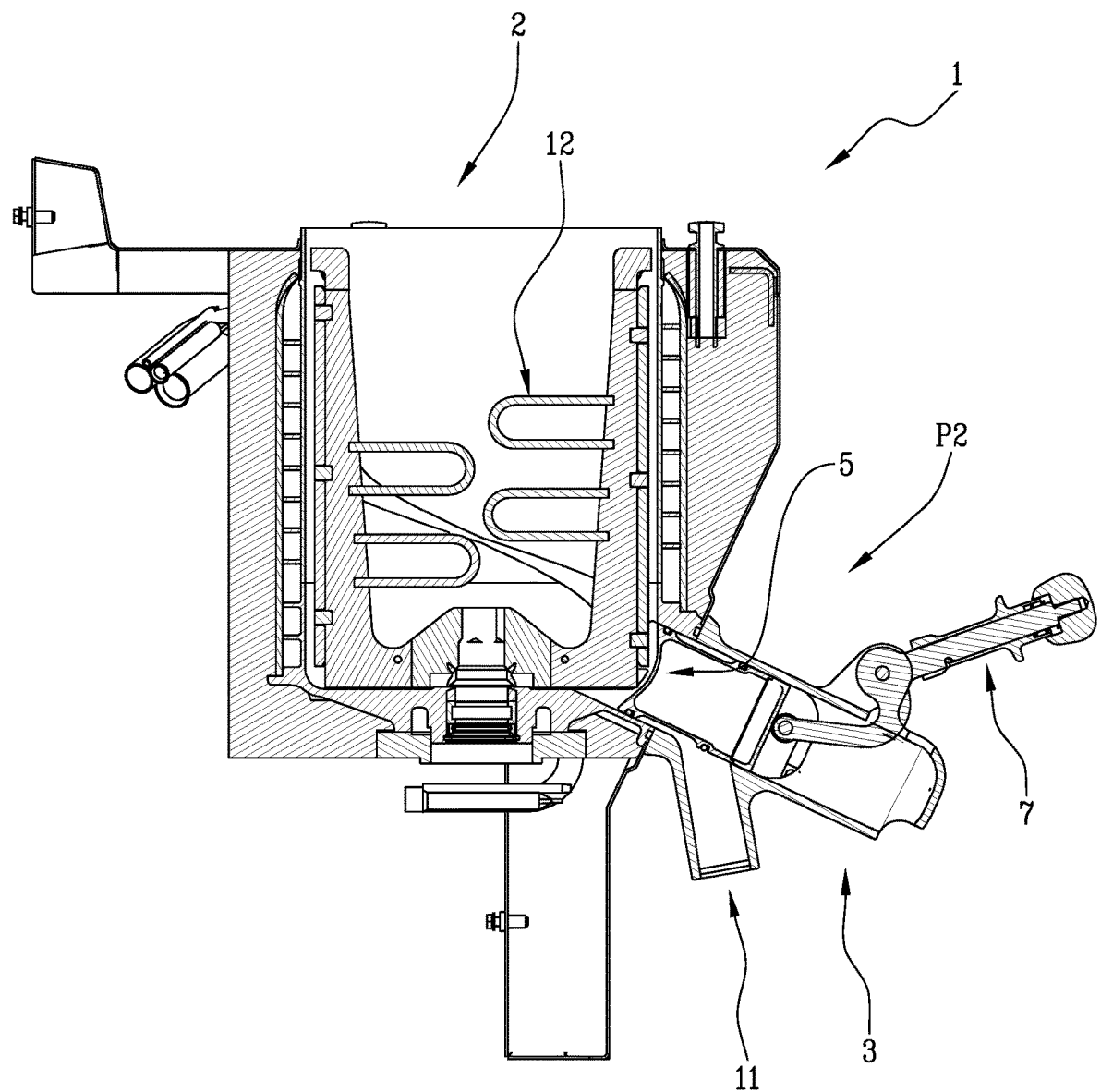

According to an aspect, the lever 7 is hinged to the supporting body 6 to rotate relative thereto to allow the shutter 5 to be moved between the open position P1 (illustrated in FIG. 8) and the closed position P2 (illustrated in FIG. 9).

According to another aspect, the lever 7 is hinged to the supporting body 6, preferably at the top.

It should be noted, in this regard, that the supporting body 6 has a perforated protrusion 21 in which a pin 22 is inserted to allow the lever 7 to be rotatably coupled thereto.

In effect, the lever 7 is provided with a hole 23 for receiving the pin 22 to allow locking the lever while allowing it to rotate relative to the protrusion 21.

According to yet another aspect, the lever 7 has a first, straight portion 7A, a second, arcuate portion 7B and a third, straight portion 7C, the arcuate portion 7B being located between the first, straight portion 7A and the third, straight portion 7C.

Figure 6A:
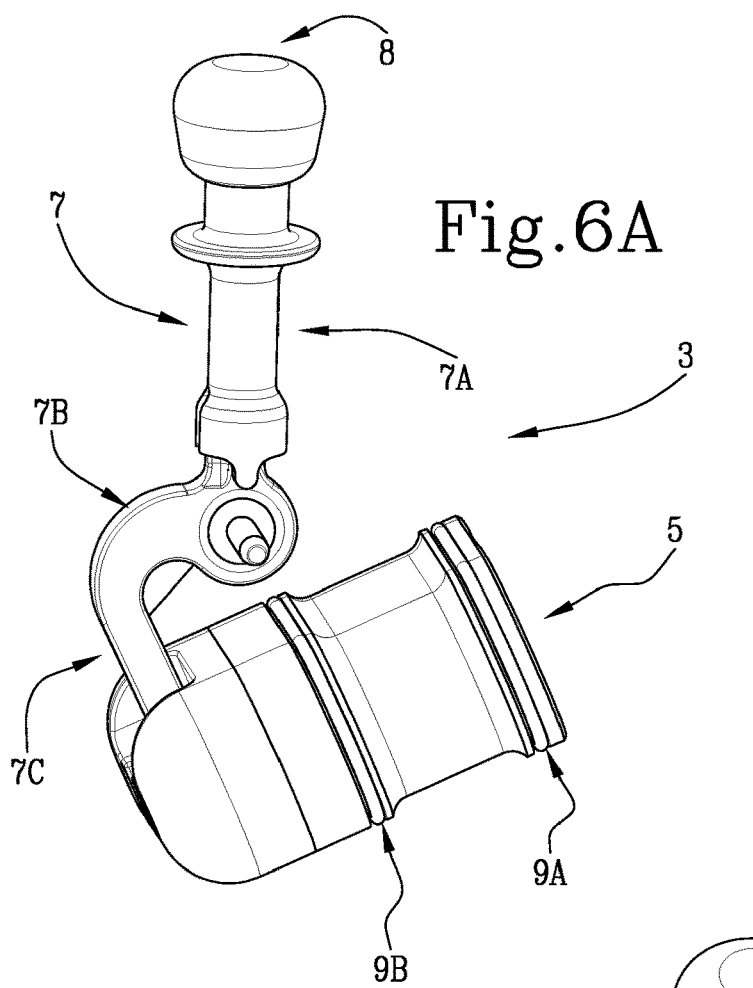
FIG. 6A shows a perspective view of the tap of FIG. 5, with some parts cut away to better illustrate others.
Figure 6B:
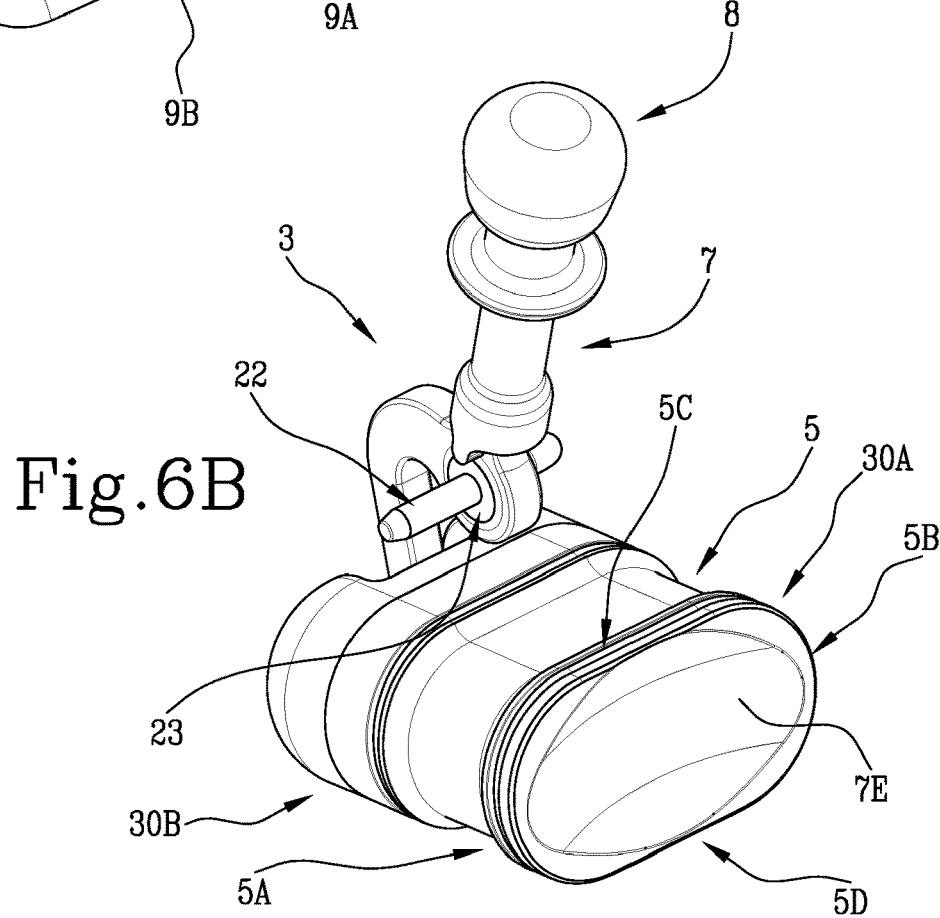
FIG. 6B shows a perspective view of the tap of FIG. 5, with some parts cut away to better illustrate others.
Figure 7:
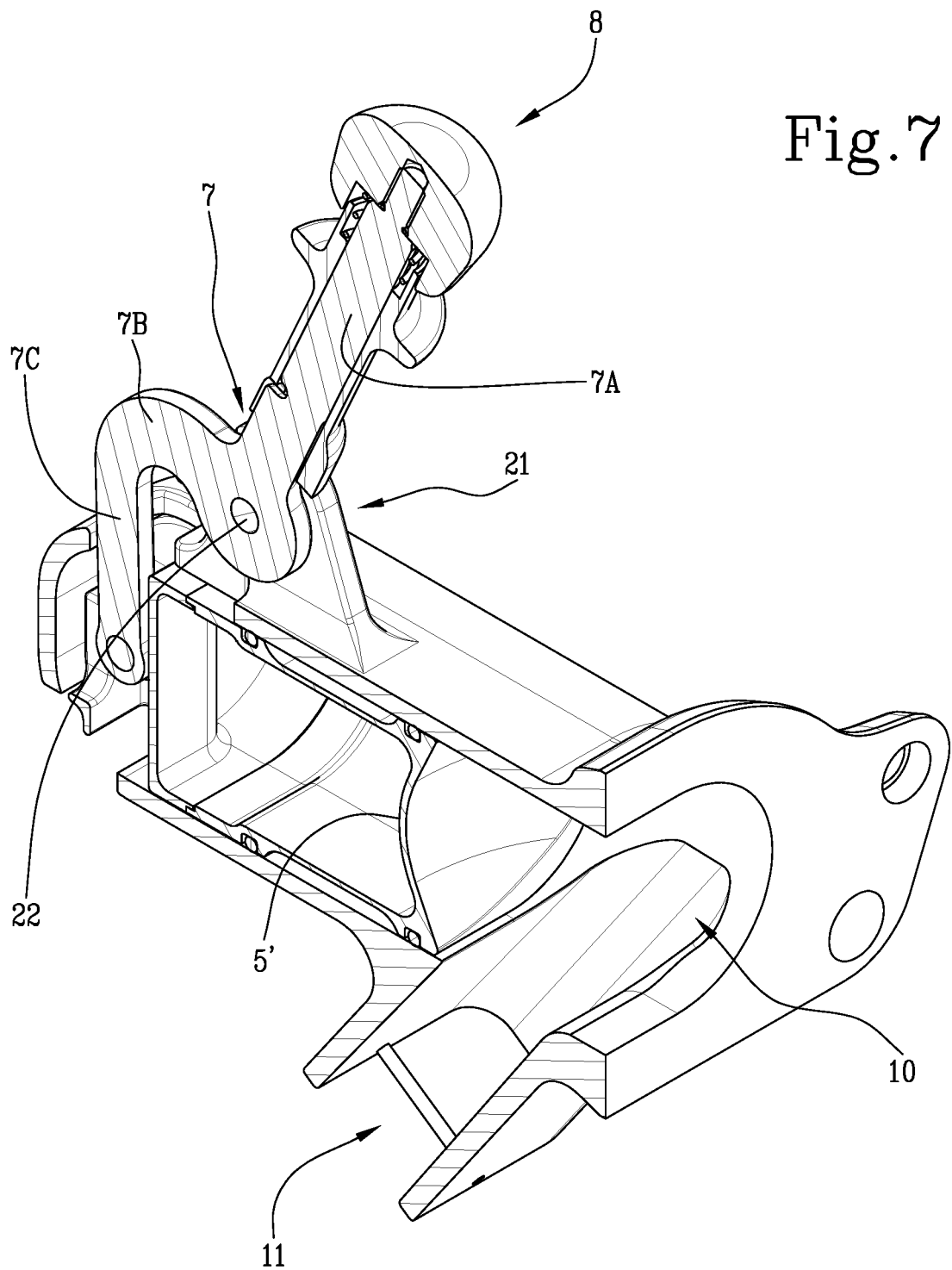
FIG. 7 is a cross-sectional view of the detail of FIGS. 5 and 6.

As may be seen clearly in FIGS. 6A and 6B, the first, straight portion 7A is provided, at one end of it, distal to the second, arcuate portion 7B, with a handgrip 8 for a user.

Preferably, the handgrip 8 is a knob (which can be coupled, preferably, to the lever 7).

According to another aspect, the shutter 5 has an oval cross section (as may be seen clearly in FIG. 6B).

Preferably, in cross section, the shutter 5 has rounded, right and left lateral edges (5A, 5B).

According to another aspect, the shutter 5, in cross section, has straight upper and lower edges (5C, 5D) that connect the right and left lateral edges (5A, 5B).

According to another aspect, the shutter 5 has a concavity 7E which, in use, is disposed to face the outlet 4.

According to yet another aspect, the machine 1 comprises at least one gasket (9A, 9B) fitted round the outside of the shutter 5 to create a seal between the shutter 5 and a cavity 10 of the hollow supporting body 6 in which the shutter 5 is slidably inserted.

According to yet another aspect, the hollow supporting body 6 comprises an outlet channel 11 (which, in use, is directed downwardly), the outlet channel 11 being fully closed when the shutter 5 is at the closed position P2.

The outlet channel 11 is in fluid connection with the cavity 10.

According to another aspect, the shutter 5 is made from elastomeric material.

According to yet another aspect, the stirrer 12 comprises a first vertical column 13A and a second vertical column 13B.

According to yet another aspect, at least one between the first vertical column 13A and the second vertical column 13B comprises mixing elements (14A; 14B) which protrude radially.

More in detail, the first vertical column 13A comprises first mixing elements 14A and the second vertical column 13B comprises second mixing elements 14B.

The mixing elements extend from the respective, first or second column (13A; 13B) and have a reverse C shape.

According to another aspect, the stirrer 12 comprises at least one helical element (15A, 15B) connecting the first vertical column 13A and the second vertical column 13B to each other.

According to another aspect, the stirrer 12 comprises a first helical element 15A that connects the first vertical column 13A and the second vertical column 13B to each other, and a second helical element 15A that connects the first vertical column 13A and the second vertical column 13B to each other.

According to yet another aspect, at least one between the first vertical column 13A and the second vertical column 13B comprises a convex contact surface (16A; 16B).

The convex contact surface is preferably adapted to contact the walls of the container 2 as the stirrer 12 rotates.

In effect, it should be noted that the stirrer 12, as described in this disclosure, is driven in rotation about an axis of rotation X1.

Preferably, the stirrer 12 is driven in rotation by a motor.

According to yet another aspect, at least one between the first vertical column 13A and the second vertical column 13B comprises a plurality of indentations (17A', 17A", 17B', 17B") defining vertical breaks along the above mentioned first vertical column 13A and second vertical column.

More specifically, the indentations (17A', 17A", 17B', 17B") are made along the edges of the convex contact surface (16A; 16B).

These breaks define segments that scrape the convex contact surface (16A; 16B) between one indentation and another.

Still more specifically, the first vertical column 13A and the second vertical column 13B comprise a plurality of indentations (17A', 17A", 17B', 17B") defining vertical breaks along the above mentioned first vertical column 13A and second vertical column 13B.

As clearly shown in the accompanying drawings, the indentations (17A', 17A", 17B', 17B") are located along both edges of the first vertical column 13A and/or of the second vertical column 13B.

According to yet another aspect, the thermal treatment means 20 comprise a first heat exchanger 18, associated with the container 2.

According to an aspect, the first heat exchanger 18 is a condenser, adapted to exchange heat with the product in order to heat it.

According to another aspect, the first heat exchanger 18 is an evaporator, adapted to exchange heat with the product in order to cool it.

According to another aspect, the machine 1 comprises electrical resistors, associated with the container 2, to cook the products inside the container 2.

More generally speaking, the thermal treatment means 20 comprise a thermodynamic system that includes the first heat exchanger 18.

According to yet another aspect, the thermodynamic system comprises a closed circuit in which the first heat exchanger 18 is operatively coupled, and the thermodynamic system also comprises a compressor 40, a throttling element 42 and a second exchanger 44 (schematically shown in FIG. 8), all operatively coupled to the closed circuit.

It should be noted that experiments have shown that the tap 3 is particularly effective in extracting from the container 2, products that are particularly viscous (to the point of being semi-solid) such as, for example, creams, jams and the like.

More specifically, the geometry of the shutter 5 and of the containing body 6 allow optimally isolating the product from, and extracting it to, the outlet channel 11.

Moreover, the lever 7 is particularly easy and effective to use.

With reference to the stirrer 12, it should be noted that it has been shown to be particularly effective for mixing high-viscosity products such as, in particular, creams and the like.

The innovation described above is susceptible of industrial application; it can be modified and adapted in several ways without thereby departing from the scope of the inventive concept; moreover, all the details may be replaced with technically equivalent elements.

What is claimed is:

1. A machine for making and dispensing food products, comprising:
   a container for containing a product to be processed and dispensed, the container having a discharge outlet for the product to be dispensed;
   a stirrer positioned inside the container;

a thermal treatment system operatively connected with the container to treat the product thermally;

a dispensing tap mounted on the discharge outlet of the container and comprising a supporting body including a cavity in fluid connection with the discharge outlet, and a shutter that is slidably mounted in the cavity of the supporting body to be movable between an open position, where the shutter allows the product to come out through the discharge outlet, and a closed position, where the shutter prevents the product from coming out through the discharge outlet, and a lever that is movably connected to the shutter, the lever being hinged to the supporting body to rotate relative thereto to allow the shutter to be moved between the open position and the closed position;

wherein the shutter has an oval cross section;

wherein the shutter has a concave surface which, in use, is disposed to face the discharge outlet;

wherein the supporting body includes an external protrusion, the external protrusion being positioned external to the cavity of the supporting body, the external protrusion including a first pivot bore;

wherein the lever includes a second pivot bore;

a pin inserted through the first pivot bore and the second pivot bore to rotatably couple the lever to the supporting body about a longitudinal axis of the pin, the longitudinal axis also being positioned external to the cavity of the supporting body;

wherein the lever includes a first, straight elongated portion, a second, arcuate portion and a third, straight elongated portion; the second, arcuate portion being located between the first, straight elongated portion and the third, straight elongated portion; the second pivot bore being positioned in the second, arcuate portion; the first, straight elongated portion adapted for manipulation by a user to cause a corresponding movement of the third, straight elongated portion; a free end of the third, straight elongated portion, distal from the second, arcuate portion, being connected to the shutter for moving the shutter between the open position and the closed position upon manipulation of the first, straight elongated portion by the user.

2. The machine according to claim 1, wherein the lever is hinged to a top of the supporting body.

3. The machine according to claim 1, wherein the shutter is movable between the open position and the closed position in a straight line.

4. The machine according to claim 1, wherein the shutter comprises a first portion and a second portion which are coupled to each other.

5. The machine according to claim 1, wherein the first, straight elongated portion includes, at one end, distal to the second, arcuate portion, a handgrip for thea user.

6. The machine according to claim 5, wherein the handgrip is a knob.

7. The machine according to claim 1, wherein the shutter, in cross section, has rounded, right and left lateral edges.

8. The machine according to claim 7, wherein the shutter, in cross section, has straight upper and lower edges that connect the right and left lateral edges.

9. The machine according to claim 1, and further comprising a gasket fitted around an outside of the shutter to create a seal between the shutter and the cavity of the hollow supporting body in which the shutter is slidably inserted.

10. The machine according to claim 1, wherein the hollow supporting body comprises an outlet channel which, in use, is directed downwardly and is in fluid connection with the cavity, the outlet channel being isolated from the cavity when the shutter is at the closed position.

11. The machine according to claim 1, wherein the shutter is made from elastomeric material.

12. The machine according to claim 1, wherein the stirrer comprises a first vertical column and a second vertical column.

13. The machine according to claim 12, wherein at least one chosen from the first vertical column and the second vertical column comprises mixing elements which protrude radially.

14. The machine according to claim 12, wherein the first vertical column comprises first mixing elements and the second vertical column comprises second mixing elements.

15. The machine according to claim 12, wherein the stirrer comprises a helical element connecting the first vertical column and the second vertical column to each other.

16. The machine according to claim 12, wherein the stirrer comprises a first helical element that connects the first vertical column and the second vertical column to each other, and a second helical element that connects the first vertical column and the second vertical column to each other.

17. The machine according to claim 12, wherein at least one chosen from the first vertical column and the second vertical column comprises a convex contact surface.

18. The machine according to claim 12, wherein at least one chosen from the first vertical column and the second vertical column comprises a plurality of indentations defining vertical breaks along the at least one chosen between the first vertical column and the second vertical column.

19. The machine according to claim 18, wherein the first vertical column and the second vertical column comprise the plurality of indentations defining the vertical breaks.

20. The machine according to claim 18, wherein the plurality of indentations are located along both edges of the first vertical column and/or of the second vertical column.

21. The machine according to claim 1, wherein the thermal treatment system comprises a first heat exchanger, operatively connected with the container.

22. The machine according to claim 21, wherein the thermal treatment system comprises a thermodynamic system which the first heat exchanger forms part of.

23. The machine according to claim 22, wherein the thermodynamic system comprises a closed circuit in which the first heat exchanger is operatively coupled, and the thermodynamic system also comprises a compressor, a throttling element and a second exchanger, all operatively coupled to the closed circuit.

24. The machine according to claim 1, and further comprising electrical resistors, associated with the container, to heat the product inside the container.

* * * * *